United States Patent [19]

Auty

[11] 4,407,384
[45] Oct. 4, 1983

[54] POWER ASSISTED STEERING ARRANGEMENTS AND DEVICES FOR USE THEREIN

[75] Inventor: David Auty, Leeds, England

[73] Assignee: Autosteer Developments Limited, Leeds, England

[21] Appl. No.: 159,905

[22] Filed: Jun. 16, 1980

[30] Foreign Application Priority Data

Jun. 30, 1979 [GB] United Kingdom ............... 7922800
Feb. 6, 1980 [GB] United Kingdom ............... 8003988

[51] Int. Cl.³ ............................................. B62D 5/06
[52] U.S. Cl. .............................. 180/146; 137/625.68; 180/149
[58] Field of Search ................... 180/132, 149, 146; 137/625.68

[56] References Cited

U.S. PATENT DOCUMENTS

| | | | |
|---|---|---|---|
| 1,719,875 | 7/1929 | Cooper | 180/146 |
| 2,796,851 | 6/1957 | Ziskrol | 137/625.68 |
| 2,826,257 | 3/1958 | Metcalf | 180/146 |
| 3,075,500 | 1/1963 | Mazur et al. | 180/146 |
| 3,199,414 | 8/1965 | Gray | 137/625.68 |

FOREIGN PATENT DOCUMENTS 55-36132 3/1980 Japan ................... 180/132

Primary Examiner—Joseph F. Peters, Jr.
Assistant Examiner—Ross Weaver
Attorney, Agent, or Firm—David A. Jackson

[57] ABSTRACT

The invention provides a control valve for an air operated power assisted steering mechanism for a vehicle. The valve has a spiral scroll and nut connection. One of these elements is connected to the steering wheel and is rotated thereby as the steering wheel is turned in a steering motion and the resulting linear motion of one of the elements is transferred into relative movement of a ported sleeve and two valve spools respectively for controlling the two directions of power assistance of the steering of the vehicle. The valve preferably is located in a hub of the steering wheel, in the steering column, or drivingly connected to the steering column by means of a transmission.

3 Claims, 9 Drawing Figures

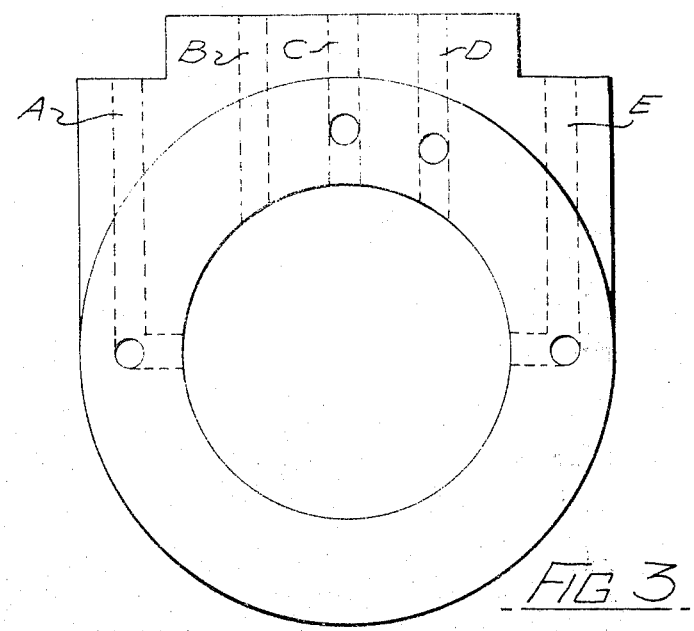
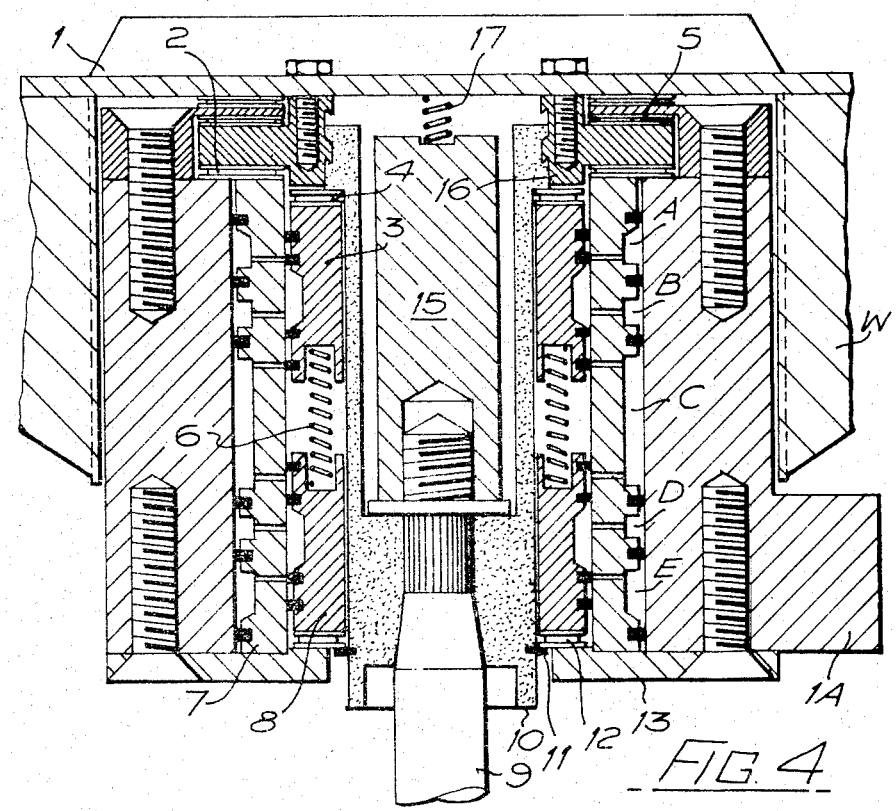

POWER ASSISTED STEERING ARRANGEMENTS AND DEVICES FOR USE THEREIN

This invention relates to power assisted steering arrangements for motor vehicles.

The use of power assisted steering arrangements in motor vehicles is well known, both in goods carrying vehicles and private vehicles.

In the majority of arrangements, a hydraulic pump is driven from the motor vehicle engine and supplies the hydraulic fluid under pressure to either side of a double acting steering ram connected to the steering linkage, or connected direct to the wheels to be steered or, as in the case of integral hydraulic systems, located within the steering gearbox. The supply of the hydraulic fluid is through a control valve which is either arranged in the link between the steering gearbox and the axle or within the steering gearbox itself, so that this valve will operate to permit the supply of fluid under pressure to the power ram only when steering effort is being applied by the driver.

There are several disadvantages of the above generally described hydraulic systems and these include that it is necessary to provide a special hydraulic pump for the power steering equipment but more importantly, if the said hydraulic pump fails and therefore the power assistance for the steering is lost, the physical effort to turn the steering wheel can increase as much as 4-fold, because the hydraulic fluid in the system will act as an almost rigid blockage to steering wheel movement due to the fluid having to be forced back through the orifices.

Some vehicles use an air operated power steering arrangement and this differs from the above described hydraulic systems mainly in that the power medium which is used for providing power is air instead of hydraulic oil. Such an arrangement has the advantage that in the event of failure of the power assistance system, the driver of the vehicle will still be able to turn the steering wheel relatively easily. Secondly, at least on heavy goods vehicles, there is invariably already a supply of compressed air which is used for operating the vehicle brakes and that supply of air can be tapped to provide the source of power for assistance of the steering.

Other problems associated with both the hydraulic and air operated systems, where either the valve or the power ram or both are embodied in a link coupling an unsprung part of the vehicle and a sprung part of the vehicle, are that the unsprung end is subjected to frequency loading and the components must be robust enough to withstand such loading. This means that the valve and/or power ram must be of relatively heavy construction (and therefore expensive) to ensure that serious failures are avoided.

The present invention is concerned with an air operated system, and we believe that such a system is more desirable than a hydraulic system because the consequences of leakage in an air system are much less inconvenient than with a hydraulic system. Also, the arrangement of the present invention we feel provides a much improved air operated system as compared to the known air operated system in terms of reliability and cost.

In the present invention there is provided a control valve for an air operated power assisted steering mechanism, the control valve being adapted so that its operation is derived from rotation of the steering wheel and in particular the valve is of a type having a rotatable drive member, the rotation of which in opposite directions effects opposite relative axial movements of control components of the valve for the appropriate directing of the pressure air to the steering ram. By this arrangement, it is possible readily to embody the rotary operated valve in the steering column shaft between the steering wheel and the steering gearbox thereby removing the valve from any substantial axial loading. This also means that the valve can be incorporated into the steering wheel hub and can in fact be made as an integral steering wheel/valve assembly. Preferably, the rotary actuation of the valve is achieved through the use of a spiral scroll shaft and nut so that the rotary action of the steering wheel is converted into linear motion of perforated sleeve means over valve spool means of the valve, thus closing exhaust ports and opening inlet ports of the valve which are connectable to the power ram to pressurise same with air thereby to providing air operated power assisted steering.

The point at which this assistance is provided can be governed either by the amount of initial rotation of the steering wheel before the inlet ports are uncovered or by splitting the central shaft and having the steering wheel connected to one control shaft part with the steering gearbox input shaft connected to the other control shaft part in which case the assistance commencement point can be controlled by installing various strength springs between two valve spools forming the valve spool means. Other types of rotary actuated air control valves could be used in this position but the advantage of this valve over any other known valve available is that through the use of scroll actuation, it is possible to produce a valve which is very compact, light weight and capable of being operated either by being incorporated into the steering wheel or column or, driven as a slave unit remote from any steering linkage.

According to another aspect of the invention, a steering wheel valve unit for a power assisted steering system is provided, the unit comprising a steering wheel and an integral steering wheel hub which embodies a valve as aforesaid.

According to a further aspect of the invention, a power assisted steering system includes a steering wheel valve unit as aforesaid, and an operated power ram for operative connection to the wheels to be steered and means connecting the valve pneumatically to the power ram for the pressurising of same in response to steering movements of the steering wheel.

According to a further aspect of the invention, a vehicle provided with a power steering arrangement includes a steering control valve as aforesaid operatively coupled to the steering wheel for operation thereby in response to steering movements of the wheel, and an air operated, steering assistance, power ram operatively coupled to the wheels to be steered and pneumatically coupled to the valve to be controlled thereby.

We prefer to provide that the power ram will be mounted entirely on the sprung part of the vehicle and this provides the advantage that it will not be subjected to such heavy loadings as in the case when it is connected between a sprung part and an unsprung part of the vehicle.

It will be appreciated that the references to sprung and unsprung mean of course the parts of the vehicle which are supported through a spring suspension arrangement and those parts which are not.

An embodiment of the present invention will now be described by way of example, with reference to the accompanying drawings, wherein:

FIG. 3 is a diagrammatic plan view illustrating the porting arrangement of the body of the valve shown in FIG. 1;

Figure 1:
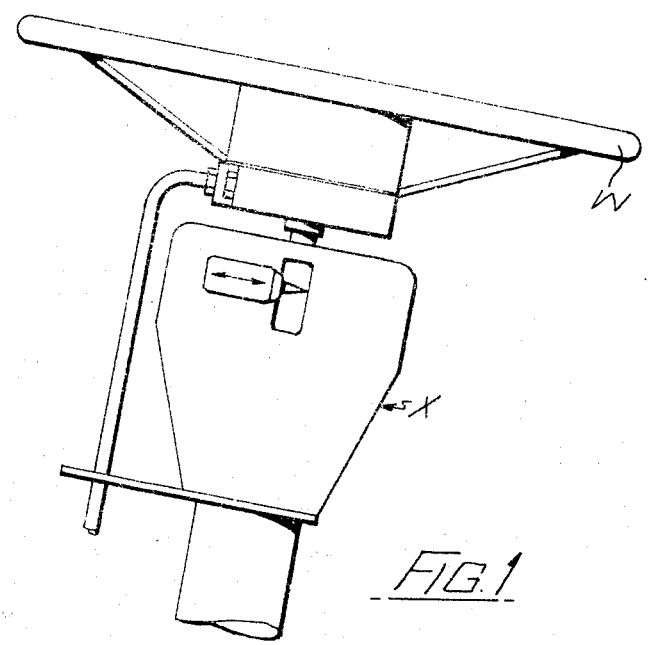
FIG. 1 is a side elevation of a steering wheel and steering column of a motor vehicle, the arrangement including a control valve of the embodiment of the invention.
Figure 4A:
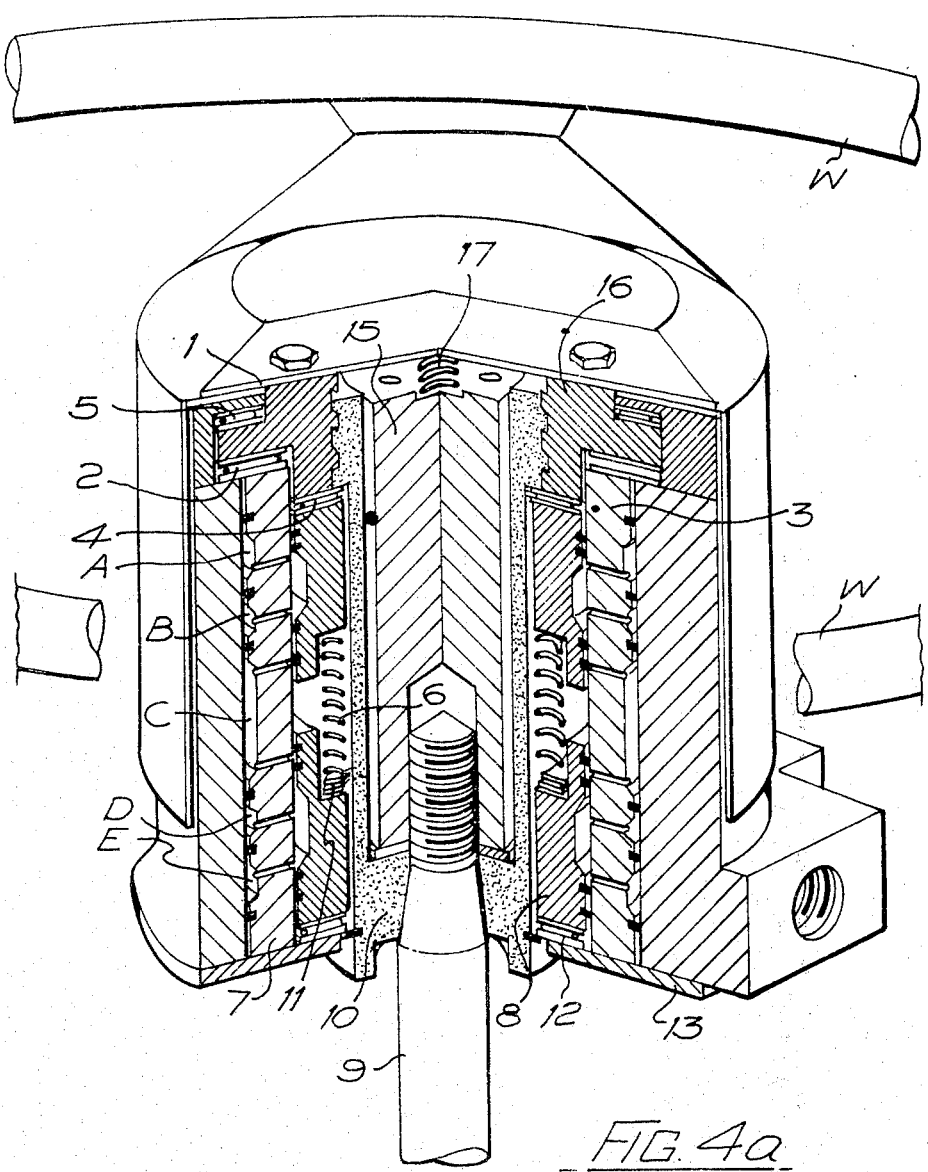
FIG. 4 is a sectional elevation of the steering wheel and control valve shown in FIG. 1, the section being taken on the line IV—IV.
Figure 5:
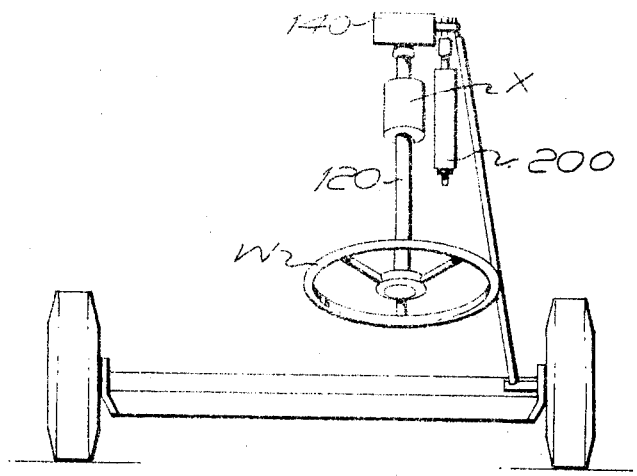
Figure 6:
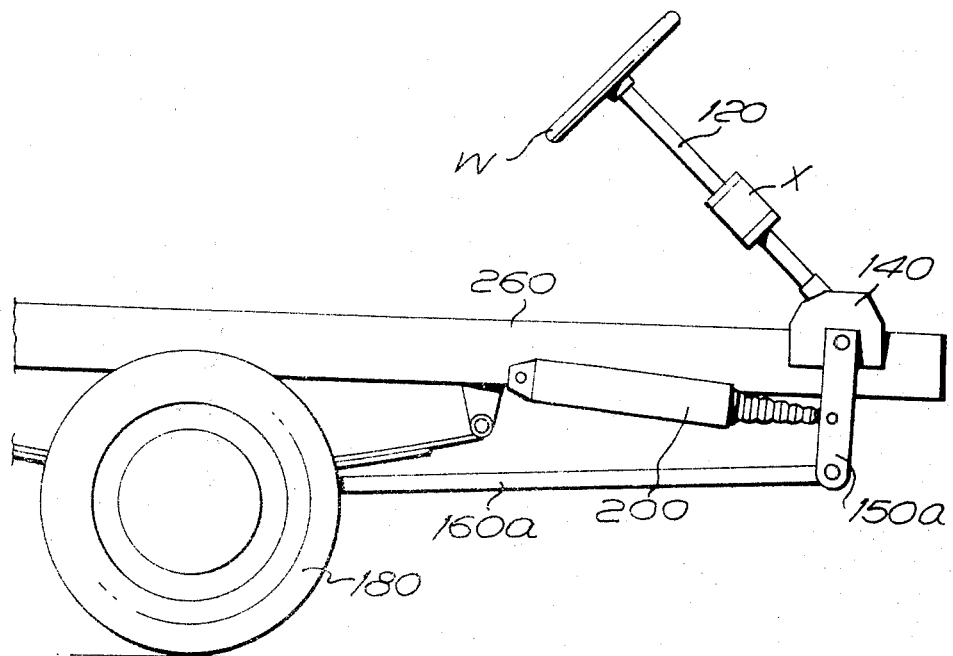
Figure 7:
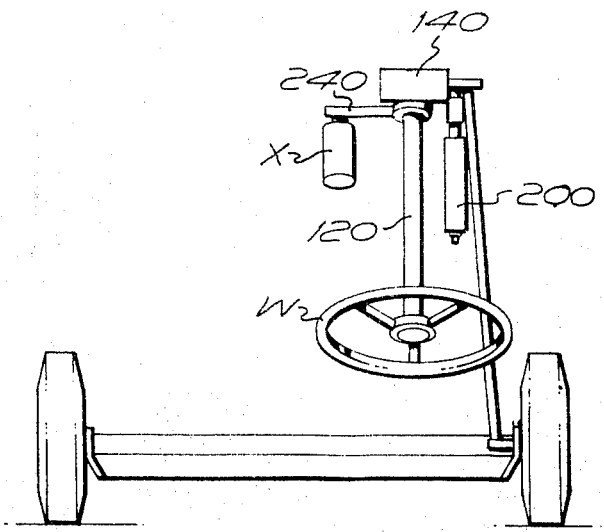
Figure 8:
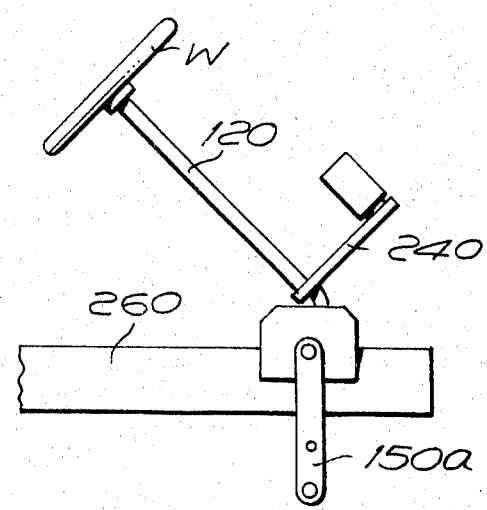

FIG. 4a is a cut away perspective view of the steering wheel and control valve shown in FIG. 1; and FIGS. 5 to 8 are diagrammatic views illustrating vehicle steering arrangements according to the invention, and incorporating valves as shown in FIG. 4, but in different locations in relation to the steering column, FIGS. 5 and 6 being a plan and side view of a first arrangement, and FIGS. 7 and 8 being a plan and side view of a second arrangement.

Referring to FIG. 1, a vehicle steering wheel is illustrated by the reference numeral W, and the control valve of the embodiment of the invention is indicated by the numeral X.

The control valve X is essentially a cylindrical assembly, with its axis on the axis of rotation of the steering wheel W. The coupling between the steering wheel W and the control valve X is described in more detail in relation to FIG. 4.

Figure 2:
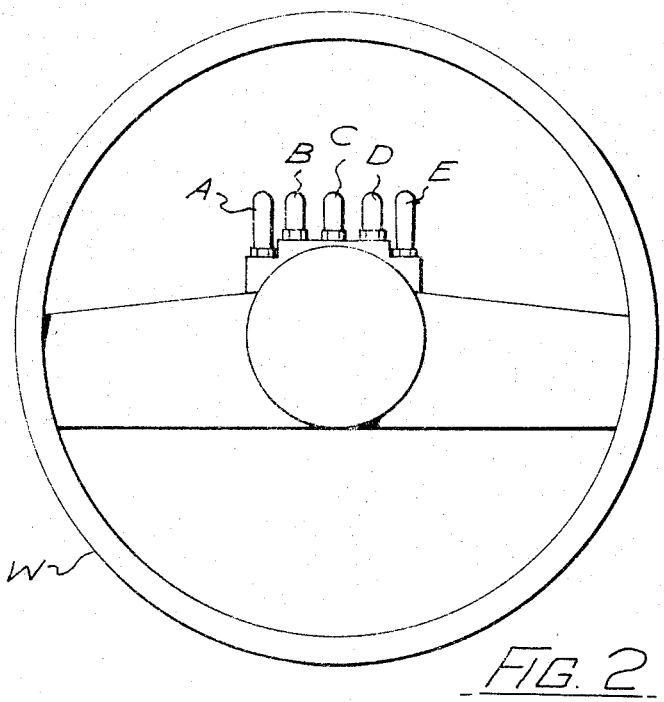
FIG. 2 is a plan view of the steering wheel shown in FIG. 1.

FIG. 2, which is a plan view of the steering wheel W, also shows certain pipe connections A, B, C, D and E which are connected to the valve X, whilst FIG. 3 shows, to an enlarged scale, the body of valve X, and in particular the porting arrangements A to E. Connection A is to exhaust, connection B and D are to the opposite sides of a double acting steering ram 200 (FIGS. 5 to 8), connection C is a supply of air under pressure, and connection E is to exhaust. In this example, the valve X controls the flow of air under pressure, the power assisted ram of the vehicle being an air pressure, double acting ram, but it is to be mentioned that the valve could in fact control a source of vacuum, and a similar result could be achieved thereby. Reference herein and in the claims to air under pressure or air pressure or pressure air, is therefore intended to include air under a negative pressure (or vacuum).

Referring now to FIGS. 4 and 4a in detail, a portion of the steering wheel W is shown, and the steering column shaft is illustrated by reference numeral 9. It is co-axial with the steering wheel W, and secured to the top end of the steering column shaft 9 is a coupling sleeve 10 to the top end of which is provided a helically threaded coupling portion defining a spiral scroll shaft. The threads of the coupling portion are engaged by a correspondingly helically threaded actuator nut or bush 16 which is secured by bolts as shown to a central flange plate 1 of the steering wheel W. A flange of the bush 16 is located between needle roller thrust bearings 2 and 5 carried by a valve body 1A.

Located in a bore in the valve body 1A and concentric with the shaft 9, is a sleeve means in the form of a parted sleeve 7 and inside the sleeve are a pair of spools 3 and 8 of symmetrical construction, and which are urged axially apart by means of a coil spring 6.

A plate 13 attached to the lower end of the valve body 1A provides a seat for a further needle roller thrust bearing 12 on which the spool 8 seats, whilst the spool 3 seats on a shoulder of the sleeve 10 through a further needle roller thrust bearing 4.

The sleeve 10 is provided with a splined portion which engages the splined end of the shaft 9 as shown, and a barrel nut 15 firmly connects the sleeve 10 and the shaft 9, said barrel nut being located inside the sleeve 10 and also being concentric with the axis of rotation of the steering wheel W and a compression spring 17 acts between the plate 1 and the top of nut 15.

The steering wheel W and the valve X, including the sleeve 10 can be supplied as a complete valve/steering wheel unit or assembly for installation in a motor vehicle in place of an existing steering wheel, and the unit therefore is extremely desirable in that it minimizes the amount of installation work necessary for converting a vehicle to power assisted steering or for replacing an existing power assisted steering unit in a vehicle already provided with suitable power assisted steering means.

Also shown in FIG. 4 are five annular galleries of the sleeve 7, these galleries being marked A,B,C,D and E because they are in fact connected to the pipes A to E already described. It is to be noted furthermore that the assembly includes annular seals between the sleeve 7 and body 1A, and between the spools 3 and 8 and the interior of the sleeve 7.

If reference is now made to FIGS. 5 to 8, and to FIGS. 5 and 6 firstly, the essential components of a vehicle steering arrangement are shown. The vehicle steering wheel is again indicated by reference W, 120 the steering column, 140 the steering gearbox, 150a pitman arm, and 160a drag link which is coupled to the steerable wheels 180. The power ram for power assisting the steering of the wheels 180 is shown by numeral 200, and in accordance with the invention is air operated and is double acting.

In the arrangement of FIGS. 5 and 6, the control valve X in fact is shown as being included in the steering column 120 spaced from wheel W, but the operation of the valve is not changed by this modification and upon turning of the steering wheel 10, the valve X is operated in order to direct pressure air to one or other side of the power ram 200, in order to effect the power assisting of the steering of the wheels 180. The valve as will be explained is arranged so that no pressure air is supplied to ram 200 until there has been a predetermined rotation of the steering wheel W to either side of a straight ahead position.

In the arrangement shown in FIGS. 7 and 8, the principle of operation is identical to that of the arrangement of FIGS. 5 and 6, except that the valve X is not included in the steering column 120, but is slave driven from the steering column through a driving belt 240 which may be of the timing belt variety.

A general point to note concerning the steering arrangements of FIGS. 5 to 8 is that the power ram 200 is mounted between the vehicle chassis 260 and the pitman arm 150 which are both sprung components of the vehicle. Furthermore, the valve X is in the drive arrangement between the steering wheel W and the steering gearbox 140. Therefore, it can be of lighter construction than when fitted into the linkage between the sprung and unsprung parts of the vehicle.

The operation of the valve described in relation to FIG. 4 in conjunction with the steering arrangements of FIGS. 5 to 8 will now be explained. The valve X is operatively coupled by the pipes A to E with the double-acting ram 200 which applies the power assistance to the vehicle steering mechanism, to exhaust and to a supply of air under pressure. The operation of the valve is best explained by considering the vehicle in three different modes of operation.

In the first mode of operation, it is assumed that the vehicle is travelling in a straight line. The components of the valve will be in the position shown in FIG. 4, and it will be seen that the supply of air under pressure to gallery C is blocked at gallery C and cannot reach any of galleries A,B,D and E. In this condition, galleries A,B,D and E are in fact open to atmosphere and no power assistance is applied to the vehicle steering wheels. The coil spring 6 maintains the spools 3 and 8 in the position shown.

In the mode of operation when the vehicle is making a right-hand turn, the wheel W will be turned accordingly and the bush 16 will also be rotated. No other parts of the valve rotate. If there is insufficient resistance to the steering effort back through the wheels as a result of the reaction with the ground, then the turning of the sleeve 16 will effect turning of sleeve 10 and steering column shaft 9, and there will be no power assistance applied to the steered wheels. If there is however sufficient reactive resistance, there will relative rotation between the bush 16 and the sleeve 10 with the result that, by virtue of the helical scroll interconnection between bush 16 and sleeve 10, the sleeve 10 will be caused to travel downwards. This downwards movement is transmitted to the body 1A and the sleeve 7, and also to the spool 3. The spool 8 however is prevented from moving downwards by virtue of seating on a circlip 11 carried by the sleeve 10, and there is relative movement between the spool 8 and the sleeve 7. The result is that the gallery C to which air under pressure is supplied is pneumatically coupled to gallery D, gallery E being closed off. The appropriate side of the power steering ram is now pressurised and the power assistance is applied to the steered wheels. As soon as the reactive force between the bush 16 and the sleeve 10 ceases, the spring 6 will return the components of the valve to the position shown, when once more gallery C is blocked and the remaining galleries are coupled to atmosphere.

In the mode of operation when a left-hand turn is made, again if there is no reaction from the wheels, the sleeve 10 and shaft 9 will rotate as a rigid body. If the reaction is sufficiently high the power assistance comes into operation, then bush 16 will again rotate relative to the sleeve 10, and in fact will move upwards relative to the sleeve 10 the spring 17 assisting in this connection to provide a lift to counter-balance the gravity effect of the mass of the assembly which lifts with bush 16. This lifting has the effect of raising body 1A, the sleeve 7, and the spool 8, but spool 3 is prevented from upwards movement by engaging a shoulder on the sleeve 10 through bearing 4. In consequence, gallery C is coupled to gallery B to apply air under pressure to the appropriate side of the power assisting ram, whilst gallery A is blocked. Galleries D and E remain connected to atmosphere. Again, when the reactive effort from the wheels to which the power assistance is applied, is removed, the device will automatically self centre and return to the position shown in FIG. 4.

It is to be noted that when there is insufficient reactive force from the wheels to cause relative rotation between the bush 16 and shaft 10, regardless of the direction of rotation, it is the force of spring 6 which keeps the bush 16 and sleeve 10 in firm engagement to behave as a rigid body.

When the said reactive force ceases in either case, it is to be noted that the valve is self-centering, and the power steering assistance is automatically removed from the steered wheels. The reactive force may terminate as a result of completing the turn, or would arise if the vehicle were to encounter an icy surface during the turn.

The valve described has certain inventive additional safety features to minimize the consequences of component failure which might otherwise result in the loss of connection between the bush 16 and the sleeve 10, and which in turn would cause loss of steering control.

The safety arrangement is achieved on right-hand turns by providing that the plate 13 is located to support the spool 8 in the event that the circlip 11 fails. In other words the spool 8 would, during the power assisted right-hand turn, if the circlip 11 were to fail, simply move back to the FIG. 4 position, seated on the plate 13, and the only consequence of loss of the circlip 11, would be a return to non-assisted steering. Furthermore, over travel of the bush 16 in making a right-hand turn is limited by the spools and spring 6.

The safety feature as applied to left-hand turns is that the spool 3 is prevented from travelling upwards of the sleeve 10 by virtue of the shoulder 17 on the said sleeve.

It is preferred that the valve body be constructed of aluminium to provide on the one hand sufficient material to permit secure mounting of end caps and also to provide for suitable internal passages so that the pipe connections can be made at the bottom of the valve. This latter feature achieves little if any increase in the height of the steering wheel as compared to a standard steering wheel.

The stiffness of the coil spring 6 dictates the response position of the control valve or in other words the wheel rim effort before the power assistance is automatically applied. For example, if it is felt that five lbs. of steering wheel rim effort is the maximum rim effort that should have to be applied, then the stiffness of spring 6 is selected to prevent relative movement between the bush 16 and sleeve 10 until this rim effort is reached. All steering movements which call for a rim effort of less than this pre-determined figure will be carried out manually and the control valve will not operate. The arrangement described is therefore an "on demand" system and will use no energy until a point is reached where assistance is required.

As is clear from FIGS. 5 to 8 it is not necessary that the valve be located in relation to the steering wheel as described, in relation to FIGS. 1 to 4 although the FIGS. 1 to 4 arrangement does however have the significant advantages as mentioned herein.

The present invention in general presents a number of advantages including the following.

1. The valve is best located on the driver's side of the steering gearbox and therefore is not subjected to the road shocks which would be the case when the valve is located in a draglink which is connected to the axle.

2. When the valve is slave driven as described herein in relation to FIGS. 7 and 8, there is no requirement to split the steering linkage at any point from the steering wheel to the road wheels, and in either case the commencement of the air supply to the power ram to provide the power assistance can be controlled either by the degree of rotation of the steering wheel from a straight ahead position or by variation of the spring between the spools.

3. Where the valve is fitted in the steering column it is subjected only to forces relating to the maximum that the driver can exert, unlike the case where the valve is located within the draglink and therefore has to be constructed to withstand both longitudinal forces resulting from multiplication by the ratio of the steering gearbox, plug high reverse "g" forces and bending moments.

4. The arrangement is suitable for use on vehicles with independent front suspension as the valve can be installed on the input rotating shaft to the rack and pinion assembly. Various ram locations can then be used. It is not possible to operate air power steering on independent front suspension with rack and pinion using the known linear type valve as there is no drag link.

When the invention is to be applied to private or light vehicles which have no existing air supply, it is proposed to make use of a small 12 volt electric compressor feeding a reservoir so that replenishment would be needed only following use of power steering assistance. Such an arrangement obviates the need to provide constant power to drive for example a hydraulic pump installation. On very light vehicles the vacuum from the inlet manifold of the engine as the power medium can be used instead of compressed air, with particular advantage.

I claim:

1. In an air operated, power assisted steering mechanism including a steering wheel, a steering shaft and a control valve adapted so that the operation of the control valve is derived from rotation of the steering wheel and in particular the valve is of a type having a rotatable drive member, the rotation of which in opposite directions effects movement of the drive member and control component of the valve is opposite relative axial movement for the appropriate directing of the pressure air to an air operated, power assisting steering ram of the mechanism, wherein the actuation of the valve is achieved by a spiral scroll shaft and nut arrangement whereby the rotary action of the steering wheel is converted into relative linear motion of ported sleeve means with respect to valve spool means of the valve, thus closing exhaust ports and opening inlet ports of the valve which are connectable to the power ram to pressurize same with air thereby to provide air operated power assisted steering, the improvement that the control valve is in a casing forming the hub of the steering wheel and the steering wheel is connected to said drive member and so effects axial movement therewith relative to the steering shaft.

2. A control valve according to claim 1 wherein the valve includes a drive bush forming the spiral scroll shaft which bush is fast with the steering shaft.

3. A motor vehicle having steerable wheels characterized by a steering mechanism as claimed in claim 1.

* * * * *